United States Patent
Eisman

(10) Patent No.: US 8,734,632 B1
(45) Date of Patent: *May 27, 2014

(54) HYDROGEN FURNACE SYSTEM AND METHOD

(71) Applicant: H2 Pump, LLC, Latham, NY (US)

(72) Inventor: Glenn A. Eisman, Niskayuna, NY (US)

(73) Assignee: H2 Pump, LLC, Latham, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,033

(22) Filed: Jan. 16, 2014

Related U.S. Application Data

(62) Division of application No. 11/969,868, filed on Jan. 4, 2008, now Pat. No. 8,663,448.

(51) Int. Cl.

| | |
|---|---|
| F27D 7/00 | (2006.01) |
| C25B 1/02 | (2006.01) |
| B01D 59/40 | (2006.01) |
| C25B 11/04 | (2006.01) |
| C25B 9/00 | (2006.01) |
| H01M 8/04 | (2006.01) |
| H01M 8/06 | (2006.01) |
| C25C 1/02 | (2006.01) |
| C25D 17/00 | (2006.01) |

(52) U.S. Cl.
USPC ............. 205/637; 432/23; 205/628; 205/639; 205/763; 205/765; 204/242; 204/266; 429/411; 429/415; 429/423; 429/444

(58) Field of Classification Search
USPC .................................................. 205/628, 637
See application file for complete search history.

(56) References Cited

U.S. PATENT DOCUMENTS

| | | | |
|---|---|---|---|
| 3,489,670 A | 1/1970 | Maget | |
| 4,620,914 A | 11/1986 | Abens | |
| 4,659,435 A | 4/1987 | Brothers et al. | |
| 5,128,003 A | 7/1992 | Murdoch et al. | |
| 5,316,644 A | 5/1994 | Titterington et al. | |
| 5,840,172 A | 11/1998 | Zugravu | |
| 6,168,705 B1 | 1/2001 | Molter et al. | |
| 6,280,865 B1* | 8/2001 | Eisman et al. | 429/411 |
| 6,826,442 B2 | 11/2004 | Takeuchi et al. | |
| 6,994,929 B2 | 2/2006 | Barbir et al. | |
| 7,045,233 B2 | 5/2006 | McElroy et al. | |
| 7,132,182 B2 | 11/2006 | McElroy et al. | |
| 7,141,323 B2 | 11/2006 | Ballantine et al. | |
| 2002/0048698 A1 | 4/2002 | Fronk | |
| 2002/0187381 A1 | 12/2002 | Monzel | |
| 2003/0196893 A1 | 10/2003 | McElroy et al. | |
| 2004/0028960 A1 | 2/2004 | McElroy et al. | |
| 2004/0028965 A1* | 2/2004 | McElroy et al. | 429/21 |
| 2004/0105773 A1 | 6/2004 | Skoczylas et al. | |
| 2004/0211679 A1 | 10/2004 | Wong et al. | |
| 2005/0058861 A1 | 3/2005 | Pettit et al. | |
| 2005/0202300 A1 | 9/2005 | Poirot-Crouvezier | |
| 2005/0214609 A1 | 9/2005 | McElroy | |
| 2005/0260473 A1 | 11/2005 | Wang et al. | |
| 2007/0128479 A1* | 6/2007 | Ballantine et al. | 429/17 |
| 2007/0207356 A1* | 9/2007 | Miyata et al. | 429/26 |
| 2008/0220305 A1 | 9/2008 | Carlstrom et al. | |
| 2009/0081492 A1 | 3/2009 | Hasuka et al. | |

FOREIGN PATENT DOCUMENTS

WO   WO 2007/014128 A2   2/2007

* cited by examiner

Primary Examiner — Dirk Bass
Assistant Examiner — Jennifer Wecker
(74) Attorney, Agent, or Firm — Hammer & Associates, P.C.

(57) ABSTRACT

Apparatus and operating methods are provided for controlled atmosphere furnace systems. In one possible embodiment, hydrogen is injected from a hydrogen source to an enclosure. The hydrogen is circulated within the enclosure from a gas inlet to a gas outlet. A temperature is raised within the enclosure to a predetermined threshold. Hydrogen is pumped from the gas outlet to the gas inlet with an electrochemical hydrogen pump. The electrochemical hydrogen pump has a first electrode in fluid communication with the gas outlet, and a second electrode in fluid communication with the gas inlet. An electrical potential is provided between the first and second electrodes, wherein the first electrode has a higher electrical potential with respect to zero than the second electrode. Various methods, features and system configurations are discussed.

9 Claims, No Drawings

HYDROGEN FURNACE SYSTEM AND METHOD

CROSS REFERENCE TO RELATED APPLICATIONS

This is a continuation application of co-pending application Ser. No. 11/969,868 filed Jan. 4, 2008 which has been allowed as U.S. Pat. No. 8,663,448, incorporated herein by reference.

TECHNICAL FIELD OF THE INVENTION

The present invention relates to apparatus and operating methods for furnaces which utilize hydrogen and electrochemical hydrogen separation systems. Various methods, features and system configurations are discussed.

BACKGROUND

Various uses are known for controlled atmosphere furnaces. For example, as part of a manufacturing process, it may be desirable to condition a material or article of manufacture by heating it in the presence of hydrogen. Such systems are sometimes referred to as hydrogen furnaces. In such applications, there is a need for apparatus and methods for providing and processing the hydrogen, as well as for operating an integrated system.

A variety of hydrogen-based electrochemical fuel cell technologies are known, wherein electrical power is produced by reacting a fuel such as hydrogen in an electrochemical cell to produce a flow of electrons across the cell, thus providing an electrical current. For example, in fuel cells utilizing proton exchange membrane technology, an electrically non-conducting proton exchange membrane is typically sandwiched between two catalyzed electrodes. One of the electrodes, typically referred to as the anode, is contacted with hydrogen. The catalyst at the anode serves to divide the hydrogen molecules into their respective protons and electrons. Each hydrogen molecule produces two protons which pass through the membrane to the other electrode, typically referred to as the cathode. The protons at the cathode react with oxygen to form water, and the residual electrons at the anode travel through an electrically conductive path around the membrane to produce an electrical current from anode to cathode. The technology is closely analogous to conventional battery technology.

Electrochemical cells can also be used to selectively transfer (or "pump") hydrogen from one side of the cell to another. For example, in a cell utilizing a proton exchange membrane, the membrane is sandwiched between a first electrode (anode) and a second electrode (cathode), a gas containing hydrogen is placed at the first electrode, and an electric potential is placed between the first and second electrodes, the potential at the first electrode with respect to ground (or "zero") being greater than the potential at the second electrode with respect to ground. Each hydrogen molecule reacted at the first electrode produces two protons which pass through the membrane to the second electrode of the cell, where they are rejoined by two electrons to form a hydrogen molecule (sometimes referred to as "evolving hydrogen" at the electrode).

Electrochemical cells used in this manner are sometimes referred to as hydrogen pumps. In addition to providing controlled transfer of hydrogen across the cell, hydrogen pumps can also be used to separate hydrogen from gas mixtures containing other components. Where the hydrogen is pumped into a confined space, such cells can be used to compress the hydrogen, at very high pressures in some cases.

There is a continuing need for apparatus, methods and applications relating to hydrogen furnaces.

SUMMARY OF THE INVENTION

Apparatus and operating methods are provided for controlled atmosphere furnace systems. In one possible embodiment, hydrogen is injected from a hydrogen source to an enclosure. The hydrogen is circulated within the enclosure from a gas inlet to a gas outlet. A temperature can be raised within the enclosure to a predetermined threshold. Hydrogen can be processed, routed, and/or purified in the system using an electrochemical hydrogen pump. The electrochemical hydrogen pump has a first electrode in fluid communication with the gas outlet, and a second electrode in fluid communication with the gas inlet. An electrical potential is provided between the first and second electrodes, wherein the first electrode has a higher electrical potential with respect to zero than the second electrode. Various aspects and features of the invention will be apparent from the following Detailed Description and from the Claims.

DETAILED DESCRIPTION OF THE INVENTION

It will be appreciated that the apparatus, methods, and applications of the invention can include any of the features described herein, either alone or in combination.

In one embodiment of the present invention, a method is provided for operating an integrated controlled atmosphere furnace system, including at least the following steps: injecting hydrogen from a hydrogen source to an enclosure; circulating hydrogen within the enclosure from a gas inlet to a gas outlet; raising a temperature within the enclosure to a predetermined threshold; pumping hydrogen from the gas outlet to the gas inlet with an electrochemical hydrogen pump, wherein the electrochemical hydrogen pump has a first electrode in fluid communication with the gas outlet, and wherein the electrochemical hydrogen pump has a second electrode in fluid communication with the gas inlet; providing an electrical potential between the first and second electrodes, wherein the first electrode has a higher electrical potential with respect to zero than the second electrode; and using a second sensor to measure hydrogen downstream from the gas outlet.

The enclosure serves as an oven (also sometimes referred to as a furnace) into which materials or articles of manufacture can be placed. In some embodiments, a conveyor system can transport materials through the enclosure to achieve a desired residence time within the enclosure. Examples of such furnaces include pusher furnaces, tunnel kilns, rotary calciners, or the like.

The hydrogen source can be a storage tank, such as a pressure vessel, or more generally it can be any source of hydrogen, including gaseous hydrogen and vaporized liquid hydrogen. In some embodiments, systems may be provided with multiple means of supplying hydrogen to the enclosure (e.g., from the hydrogen source, from the electrochemical cell outlet, etc.). For example, on start up, a hydrogen pressure vessel can be used to charge the atmosphere of the enclosure with a desired amount of hydrogen. In this context, the "atmosphere of the enclosure" refers to the body of gas inside the enclosure. The atmosphere outside the enclosure may be referred to as ambient or ambient atmosphere in some cases.

During operation of the system, the electrochemical hydrogen pump can be used to recover and recirculate the hydrogen in the enclosure, in some cases to maintain a desired level of hydrogen in the enclosure. For example, in a system utilizing a conveyor passing through the enclosure, the electrochemical hydrogen pump can remove hydrogen from the enclosure atmosphere at the conveyor outlet or any other point to prevent the hydrogen from being vented to ambient where the conveyor exits the enclosure. Similarly, in furnace systems where the furnace enclosure is sealed during use and then opened to allow removal of a material or article from the furnace when conditioning is complete, the electrochemical hydrogen pump can serve to capture any hydrogen that may be vented to the atmosphere outside the enclosure when the enclosure is opened. It will be appreciated that as the cell is maintained with a voltage across it, essentially any hydrogen that comes in contact with the first electrode will be pumped to the second electrode.

As a part of the electrochemical pumping process, the electrochemical hydrogen pump also serves to purify the hydrogen in the enclosure. In some embodiments, the gas inside the enclosure can be purified by the electrochemical pump by exhausting it from the enclosure, removing hydrogen from it, and injecting the pumped hydrogen into fresh gas that is introduced into the enclosure. As examples, the fresh gas can be hydrogen, air, nitrogen, or other gases suited for a particular application. It will also be appreciated that some of the hydrogen may be consumed or reacted inside the system, for example in reaction with the material or article being heated.

In general, any opening through which hydrogen can flow from the enclosure is referred to as a gas outlet. Similarly, any opening though which hydrogen can flow into the enclosure is referred to as a gas inlet. In this context, circulation of hydrogen from the gas inlet to the gas outlet refers to any flow of hydrogen into and/or out of the enclosure.

In some embodiments, the electrochemical hydrogen pump can also be used to control hydrogen flow from the hydrogen source to the enclosure. For example, the pressure developed at the outlet of the electrochemical hydrogen pump can be used to actuate a check valve leading to the enclosure. In some embodiments, the electrochemical hydrogen pump can also be used to supply hydrogen to the hydrogen source. For example, recirculated hydrogen from the enclosure can be stored in a pressure vessel. It will be appreciated that electrochemical hydrogen pumps can be used to generate substantial outlet pressures that can be varied according to the needs of a particular system configuration. Thus, in some embodiments, the step of pumping hydrogen from the gas outlet to the gas inlet can include injecting hydrogen from the electrochemical hydrogen pump into the hydrogen source.

Systems under the present invention can utilize any suitable means for controlling the temperature inside the enclosure. For example, an electric heating element or combustion process can be used to raise the temperature of the atmosphere inside the enclosure. In some embodiments, hydrogen can be combusted to provide the heat. It may also be necessary to prevent combustion of hydrogen in the enclosure atmosphere. For example, the amount of oxygen in the enclosure may be limited, either by flushing the atmosphere with hydrogen, or by injecting an inert gas into the enclosure atmosphere such as nitrogen. In some embodiments, systems may thus include an inert gas source adapted to flow inert gas into the enclosure. In some embodiments, an oxygen sensor can be used to detect oxygen in the enclosure atmosphere. As an example, such a sensor can be coupled to a controller configured to increase a flow of hydrogen and/or inert gas through the enclosure to maintain the oxygen concentration in the enclosure below a predetermined threshold.

The electrochemical hydrogen pump can be any electrochemical cell suitable for electrochemically pumping hydrogen. As an example, PEM (proton exchange membrane)-based cells can be used, where the proton exchange membrane can be any of various known materials suitable for transporting protons (Polybenzimidazole (PBI), Nafion®, PEEK, etc.). The proton conductor may also include solid state proton conducting materials such as Calcium Hydrogen Phosphate. In the present invention, while reference is generally made to individual cells, it will be appreciated that such cells can form individual units within stacks of cells. The invention covers stack configurations as well as individual cell configurations.

In some embodiments of methods under the present invention, the step of injecting hydrogen from the hydrogen source to the enclosure is performed in response to a signal from a first sensor adapted to measure hydrogen within the enclosure. For example, a controller can be used to actuate the pump as needed to maintain a desired concentration of hydrogen in the enclosure.

In some instances, the electrochemical pump can be operated in a "pump-on-demand" mode, e.g., using a fixed applied voltage to drive any hydrogen across the separator which comes into contact with it, which will generate a current proportional to the amount of hydrogen present. The voltage drop or the generated current in amperes can act in itself as a "sensor" and be correlated to changes associated with the pump or the furnace, such as hydrogen concentration, hydrogen flow, etc. In other embodiments, a passive "on demand" system is provided where a voltage is maintained across the electrochemical hydrogen pump sufficient to recirculate hydrogen as it comes into contact with the cell. It may thus be desirable to maintain the electrical potential between the first and second electrodes of the cell above a predetermined threshold according to the operating characteristics of the cell (e.g., 0.3 volts, 0.7 volts, 1.0 volts, etc.).

In some embodiments, methods under the present invention may include the step of oxidizing an effluent gas from the furnace gas outlet. In some embodiments, this step may be performed when a signal from the second sensor measuring hydrogen at the gas outlet indicates that a hydrogen level of the effluent gas is above a predetermined threshold. Thus, the system can be configured to ensure that hydrogen is not vented to the atmosphere outside the enclosure.

In some embodiments, methods under the present invention may include the step of humidifying an effluent gas from the gas outlet at a location that is upstream from the first electrode of the electrochemical hydrogen pump. It will be appreciated that in some cases it can be desirable to operate an electrochemical cell in a humidified state. Thus, the gas that is contacted with the cell can be humidified. It will also be appreciated that some electrochemical cells operate more efficiently at elevated temperatures. For example, with PBI-based cells, operation may be desired at about 100 C or other temperatures according to the particular PBI based membrane that is utilized. In some embodiments, the systems under the present invention can thermally integrate the enclosure with the cell to provide the cell with suitable heat for operating at elevated temperatures. For example, the cell can be located or partially located within the enclosure. Such systems may also include a mechanism such as a fan or coolant circuit for cooling the cell. Liquid cooling methods may also be incorporated as potential sub-systems to the systems described herein.

In some embodiments, a controller can be coupled to a network of sensors to maintain a desired hydrogen concentration in the enclosure. As an example, the step of injecting hydrogen from the hydrogen source to the enclosure can be performed when a hydrogen level within the enclosure is below a predetermined threshold, and the step of pumping hydrogen from the gas outlet to the gas inlet can be performed when a hydrogen level downstream from the gas outlet is above a predetermined threshold.

In some embodiments, systems and associated methods under the present invention can include utilizing various known hydrogen separation methods to filter hydrogen from the electrochemical hydrogen pump effluent to the gas inlet. For example, such separation methods can include palladium membranes or other polymer or ceramic membranes suitable for filtering hydrogen. In particular, palladium membranes are a well known means of filtering hydrogen from a source gas. As an example, a palladium membrane can be positioned in fluid communication between the second electrode of the electrochemical hydrogen pump and the gas inlet. As known in the art, in some cases it may be desirable to heat the palladium membrane to a desired operating temperature, such temperature chosen according to the operating characteristics of the particular palladium membrane system utilized.

In another embodiment, the invention provides a controlled atmosphere furnace system. The system includes a gas inlet and a gas outlet, and an electrochemical hydrogen pump. The electrochemical hydrogen pump has a first electrode in fluid communication with the gas outlet, and a second electrode in fluid communication with the gas inlet. The system also includes a power supply adapted to maintain an electrical potential between the first and second electrodes, wherein the first electrode has a higher electrical potential with respect to zero than the second electrode. A hydrogen source is adapted to flow hydrogen into the enclosure. A first sensor is adapted to measure hydrogen within the enclosure, and a second sensor is adapted to measure hydrogen downstream from the gas outlet. A heater is adapted within the system to raise an internal temperature of the enclosure.

A controller is configured to restrict a flow of hydrogen from the hydrogen source to the enclosure in response to a signal from the first sensor when a hydrogen level at the first sensor is below a predetermined threshold. The controller can also be adapted to energize the electrochemical hydrogen pump to flow hydrogen from the gas outlet to the gas inlet in response to a signal from the second sensor when a hydrogen level at the second sensor is above a predetermined threshold. The controller can also be adapted to modulate a flow of inert gas into the enclosure to maintain an oxygen level in the enclosure below a predetermined threshold.

In some embodiments, systems under the present invention can also include a vent in fluid communication between the gas outlet and an atmosphere external to the system, and an oxidizer adapted to remove hydrogen from an effluent gas flowed through the vent to the atmosphere. As examples, the oxidizer can be a flame, electrical heating element, or arrangement similar to an automotive catalytic converter.

The inventive concepts discussed in the claims build on traditional electrochemical cells technologies that are well known in the art. As examples, various suitable designs and operating methods that can be used as a base to implement the present invention are described in the teachings of U.S. Pat. Nos. 4,620,914; 6,280,865; 7,132,182 and published U.S. patent application Ser. Nos. 10/478,852, 11/696,179, 11/737,730, 11/737,733, 11/737,737, and 11/743,612 which are each hereby incorporated by reference in their entirety.

While the invention has been shown or described in only some of its forms, it should be apparent to those skilled in the art that it is not so limited, but is susceptible to various changes without departing from the scope of the invention.

I claim:

1. A method of operating an integrated controlled atmosphere furnace system comprising:
    providing a controlled atmosphere furnace to condition a material or an article of manufacture by heating in the presence of hydrogen, the controlled atmosphere furnace has a furnace gas inlet and a furnace gas outlet, said furnace having a conveyor therethrough;
    injecting hydrogen from a hydrogen source to the controlled atmosphere furnace through the furnace gas inlet;
    circulating hydrogen within the controlled atmosphere furnace from the furnace gas inlet to the furnace gas outlet;
    pumping hydrogen from the furnace gas outlet to the furnace gas inlet with an electrochemical hydrogen pump, the hydrogen entering into the furnace gas inlet from the electrochemical hydrogen pump consists of hydrogen, the electrochemical hydrogen pump being outside the controlled atmosphere furnace, the electrochemical hydrogen pump has a first electrode in fluid communication with the furnace gas outlet and has a second electrode in fluid communication with the furnace gas inlet; and providing an electrical potential between the first and second electrodes, the first electrode has a higher electrical potential with respect to zero than the second electrode.

2. A method of operating an integrated controlled atmosphere furnace system comprising:
    providing a controlled atmosphere furnace to condition a material or an article of manufacture by heating in the presence of hydrogen, the controlled atmosphere furnace has a furnace gas inlet and a furnace gas outlet, said furnace being sealed during use;
    injecting hydrogen from a hydrogen source to the controlled atmosphere furnace through the furnace gas inlet;
    circulating hydrogen within the controlled atmosphere furnace from the furnace gas inlet to the furnace gas outlet;
    pumping hydrogen from the furnace gas outlet to the furnace gas inlet with an electrochemical hydrogen pump, the hydrogen entering into the furnace gas inlet from the electrochemical hydrogen pump consists of hydrogen, the electrochemical hydrogen pump being outside the controlled atmosphere furnace, the electrochemical hydrogen pump has a first electrode in fluid communication with the furnace gas outlet and has a second electrode in fluid communication with the furnace gas inlet; and providing an electrical potential between the first and second electrodes, the first electrode has a higher electrical potential with respect to zero than the second electrode.

3. A method of operating an integrated controlled atmosphere furnace system comprising:
    providing a controlled atmosphere furnace to condition a material or an article of manufacture by heating in the presence of hydrogen, the controlled atmosphere furnace has a furnace gas inlet and a furnace gas outlet;
    injecting hydrogen from a hydrogen source to the controlled atmosphere furnace through the furnace gas inlet;
    circulating hydrogen within the controlled atmosphere furnace from the furnace gas inlet to the furnace gas outlet;
    pumping hydrogen from the furnace gas outlet to the furnace gas inlet with an electrochemical hydrogen pump, the hydrogen entering into the furnace gas inlet from the electrochemical hydrogen pump consists of hydrogen, the electrochemical hydrogen pump being outside the controlled atmosphere furnace, the electrochemical hydrogen pump has a first electrode in fluid communication with the furnace gas outlet and has a second electrode in fluid communication with the furnace gas inlet; and providing an electrical potential between the first and second electrodes, the first electrode has a higher electrical potential with respect to zero than the second electrode, the electrochemical pump including a proton exchange membrane.

4. The method according to claim 3 wherein the proton exchange membrane being made of a material selected from selected from the group consisting of: polybenzimidazole, perfluorosulfonic acid, PEEK, and solid state proton conducting material.

5. The method according to claim 4 wherein the solid state proton conducting material being calcium hydrogen phosphate.

6. A method of operating an integrated controlled atmosphere furnace system comprising:
providing a controlled atmosphere furnace to condition a material or an article of manufacture by heating in the presence of hydrogen, the controlled atmosphere furnace has a furnace gas inlet and a furnace gas outlet;
injecting hydrogen from a hydrogen source to the controlled atmosphere furnace through the furnace gas inlet;
circulating hydrogen within the controlled atmosphere furnace from the furnace gas inlet to the furnace gas outlet;
pumping hydrogen from the furnace gas outlet to the furnace gas inlet with an electrochemical hydrogen pump, the hydrogen entering into the furnace gas inlet from the electrochemical hydrogen pump consists of hydrogen, the electrochemical hydrogen pump being outside the controlled atmosphere furnace, the electrochemical hydrogen pump has a first electrode in fluid communication with the furnace gas outlet and has a second electrode in fluid communication with the furnace gas inlet; and providing an electrical potential between the first and second electrodes, the first electrode has a higher electrical potential with respect to zero than the second electrode; and
controlling hydrogen content within the controlled atmosphere furnace via a controller connected to a network of sensors.

7. A method of operating an integrated controlled atmosphere furnace system comprising:
providing a controlled atmosphere furnace to condition a material or an article of manufacture by heating in the presence of hydrogen, the controlled atmosphere furnace has a furnace gas inlet and a furnace gas outlet;
injecting hydrogen from a hydrogen source to the controlled atmosphere furnace through the furnace gas inlet;
circulating hydrogen within the controlled atmosphere furnace from the furnace gas inlet to the furnace gas outlet;
pumping hydrogen from the furnace gas outlet to the furnace gas inlet with an electrochemical hydrogen pump, the hydrogen entering into the furnace gas inlet from the electrochemical hydrogen pump consists of hydrogen, the electrochemical hydrogen pump being outside the controlled atmosphere furnace, the electrochemical hydrogen pump has a first electrode in fluid communication with the furnace gas outlet and has a second electrode in fluid communication with the furnace gas inlet; and providing an electrical potential between the first and second electrodes, the first electrode has a higher electrical potential with respect to zero than the second electrode; and
filtering hydrogen with a filter located between the electrochemical pump and the furnace gas inlet.

8. The method according to claim 7 wherein the filter being a membrane filter.

9. The method according to claim 8 wherein the membrane filter being made of a material selected from the group consisting of palladium, polymer or ceramic.

* * * * *